(12) United States Patent
Vogel (10) Patent No.: US 8,695,817 B2
(45) Date of Patent: Apr. 15, 2014

(54) LIFTING DEVICE FOR REPLACING DYNAMIC OR STATIC COMPONENTS OF HELICOPTER-TYPE AIRCRAFT

(75) Inventor: Dominik Vogel, Rain (DE)

(73) Assignee: Airbus Helicopters Deutschland GmbH, Donawoerth (DE)

( * ) Notice: Subject to any disclaimer, the term of this patent is extended or adjusted under 35 U.S.C. 154(b) by 527 days.

(21) Appl. No.: 12/899,790

(22) Filed: Oct. 7, 2010

(65) Prior Publication Data

US 2011/0147328 A1 Jun. 23, 2011

(30) Foreign Application Priority Data

Dec. 22, 2009 (EP) ..................................... 09400062

(51) Int. Cl.
*B66C 19/00* (2006.01)
(52) U.S. Cl.
USPC .......................................... 212/331; 212/330
(58) Field of Classification Search
USPC ......... 212/175, 179, 301, 302, 306, 312, 317, 212/320–325, 328, 330, 331; 414/560, 561, 414/618, 626; 244/17.11, 117 R
See application file for complete search history.

(56) References Cited

U.S. PATENT DOCUMENTS

| 3,071,349 | A | | 1/1963 | Glaze |
| 3,380,688 | A | | 4/1968 | Adams |
| 3,845,937 | A | * | 11/1974 | Johnson et al. ................. 258/1.8 |
| 2004/0006930 | A1 | | 1/2004 | Farion |

FOREIGN PATENT DOCUMENTS

| CN | 1432509 A | 7/2003 |
| GB | 273912 A | 7/1927 |
| GB | 863085 | 3/1961 |
| WO | 9306008 A1 | 4/1993 |

OTHER PUBLICATIONS

European Search Report, European application No. EP 09 40 0062; dated May 6, 2010.

* cited by examiner

*Primary Examiner* — Emmanuel M Marcelo
*Assistant Examiner* — Angela Caligiuri
(74) *Attorney, Agent, or Firm* — Brooks Kushman P.C.

(57) ABSTRACT

A lifting device for replacing dynamic or static components of helicopter-type rotary wing aircraft comprising a lifter capable of moving components between an installation/removal position and a loading/unloading position located near the aircraft, a supporting structure on which the lifter is mounted, and at least one support member is rigidly attached to the supporting structure. The at least one support member can rest on and be directly secured to the airframe of the aircraft.

17 Claims, 6 Drawing Sheets

LIFTING DEVICE FOR REPLACING DYNAMIC OR STATIC COMPONENTS OF HELICOPTER-TYPE AIRCRAFT

CROSS-REFERENCE TO RELATED APPLICATION

This application claims the benefit of European Application No. 09 400062.7 dated Dec. 22, 2009, the disclosure of which is incorporated herein by reference.

FIELD OF THE INVENTION

The present invention generally concerns the technical repair of rotary wing aircraft, particularly helicopters. Although specific reference will be made hereinafter to helicopters, the present invention is clearly applicable to all types of rotary wing aircraft.

When a helicopter suffers a severe malfunction that prevents it from pursuing its mission, it may need to perform an emergency landing in an area that is difficult or impossible to access due to the nature of the terrain, such as a mountain area. The helicopter may suffer a mechanical or electrical engine malfunction and/or a deterioration of one of its structural components, damages on dynamic components (rotor blades, shafts, gearboxes etc. . . . ), causing it to remain immobilised without possibility of repair by crew members using on-board equipment.

In addition, landing areas may be controlled by enemy forces and therefore inaccessible for land vehicles transporting the components needed to repair the helicopter or used to load and retrieve said helicopter. In war zones, the helicopter is therefore either abandoned or destroyed.

BACKGROUND OF THE INVENTION

Document GB 863 085 describes a lifting device which comprises lifting means directly mounted on structural tubes of a helicopter frame. A supporting structure, immobilization means securing the supporting structure to the frame are also disclosed.

Document U.S. Pat. No. 3,380,688 describes a device for mounting and/or dismounting in particular helicopter engines. The device comprises a support member coupled to the rotor head of the helicopter and a carriage member movable horizontally on said support member.

SUMMARY OF THE INVENTION

The present invention aims to provide a new device that can be used to overcome the above-mentioned limitations and repair the helicopter on site.

Another aim of the invention is to provide a new device suitable for the type of helicopter to be repaired.

Another aim of the invention is to provide a new device suited for use in all types of terrain.

The intended aims of the present invention are achieved by means of a lifting device for replacing dynamic or static components of helicopter-type rotary wing aircraft. In one embodiment, the device comprises:

a lifting means to move the components between an installation/removal position and a loading/unloading position located near the aircraft, a supporting structure on which the lifting means is mounted, support means rigidly attached to the supporting structure, designed to rest on and/or be directly secured to an airframe of the aircraft, and immobilization or attachment means to secure the supporting structure to the airframe.

According to an example of an embodiment of the lifting device of the present invention, the lifting means is mounted in a movable manner on the supporting structure. This facilitates access to the various dynamic or static components to be removed from the helicopter.

According to an example of an embodiment of the present invention, the lifting device comprises handling means to move the lifting means from a position located near the aircraft to an operational position on the supporting structure, once the latter has been secured to the airframe. This facilitates the work of repair personnel, particularly in the absence of other means, such as a crane, to place the lifting means in an operational position.

According to an example of an embodiment of the present invention, the lifting device comprises stabilization means designed to be secured to the supporting structure and to rest on the ground. The stabilization means are subsequently also used to stabilize the aircraft.

According to another example of an embodiment of the present invention, the handling means at least partly constitute the stabilization means.

According to an example of an embodiment of the present invention, the support means comprise pads capable of locally adapting to the outer shape of the airframe and resting directly on said airframe. In this manner, the helicopter is used as a means to stabilize the lifting device. The number of stabilization components required can therefore be reduced.

According to an example of an embodiment of the present invention, the pads are distributed on the supporting structure in such a manner that when said supporting structure is mounted on the airframe, their positions correspond to reinforced regions of said airframe. This prevents risks of airframe deformation.

According to an example of an embodiment of the present invention, the supporting structure comprises at least one part on which the lifting means travels. The latter can thus position itself in an optimal manner with respect to the components to be replaced.

According to an example of an embodiment of the present invention, the supporting structure comprises a first part equipped with support means and a second part equipped with ground-based support members, extending longitudinally from the first part.

According to an example of an embodiment of the present invention, the first part of the supporting structure comprises two parallel rails resting on the airframe in a substantially centred manner, via the support means.

Therefore, in case of unstable terrain, the helicopter alone can ensure the stability of the lifting device.

According to an example of an embodiment of the present invention, the lifting means is an articulated and/or telescopic arm.

The lifting means may, for example, be mounted rotationally movable on a trolley, which itself is translationally movable on the supporting structure.

According to an example of an embodiment of the present invention, the lifting device is associated with airframe reinforcement means arranged inside said airframe. This prevents the risk of airframe deformation due to the significant weight of the lifting means when lifting a component such as an engine.

According to an example of an embodiment of the present invention, the supporting structure comprises a first lateral part equipped with support means in contact with an upper lateral part of the airframe, and a second lateral part extending from the first lateral part, said second lateral part being equipped with ground-based support members.

Therefore, in case of unstable terrain, the helicopter alone can significantly contribute to ensuring the stability of the lifting device. Such an example of an embodiment is suited for replacing the lateral components of the helicopter as well as other components.

According to such an example of an embodiment of the present invention, the lifting means is a winch or hoist type device mounted on a mobile structure moving at least translationally in at least one direction on the first and second lateral parts.

According to an example of an embodiment of the present invention, the lifting device comprises hydraulic and/or electrical control means. These control means are advantageously powered by the helicopter itself or by a specific power source that is part of the lifting device.

According to an example of an embodiment of the present invention, the lifting device is modular, with dimensions after disassembly allowing it to be transported as internal or external load on a helicopter. In certain situations, the possibility of integrating the lifting device with the helicopter's on-board equipment can also be considered.

The lifting device of the present invention provides the advantage of being compact and adaptable to all types of terrain.

Another advantage of the lifting device of the present invention is its modular design, allowing easy assembly and disassembly.

Another advantage of the lifting device of the present invention is that it can be used to replace all dynamic or static components of the helicopter, even large or heavy components, thus allowing said helicopter to pursue its mission or return to its base once the replacement of the defective components has been completed.

Another advantage of the lifting device of the present invention is that it is independent on the infrastructure.

Another advantage of the lifting device of the present invention is it can be used to replace/change all necessary components of the aircraft or helicopter.

Another advantage of the lifting device of the present invention is that it can be carried by internal or external cargo (load).

Another advantage of the lifting device of the present invention is that it contributes to stabilize the helicopter or aircraft.

Another advantage of the lifting device of the present invention is that it reduces risks. The helicopter can land instead of flying without damage, since a maintenance operation can take place.

BRIEF DESCRIPTION OF THE DRAWINGS

The characteristics and advantages of the present invention will become more apparent from the description that follows of illustrative, non-exhaustive examples of embodiments, given with reference to the attached figures, where.

DETAILED DESCRIPTION OF THE PREFERRED EMBODIMENT

Structurally and functionally identical components appearing in different figures are assigned the same numerical reference.

In addition, structural and/or functional characteristics described for a given embodiment of the lifting device of the present invention may be present in another embodiment without necessarily being described again.

A first design of the lifting device of the present invention is shown in FIGS. 1 to 10.

Figure 1:
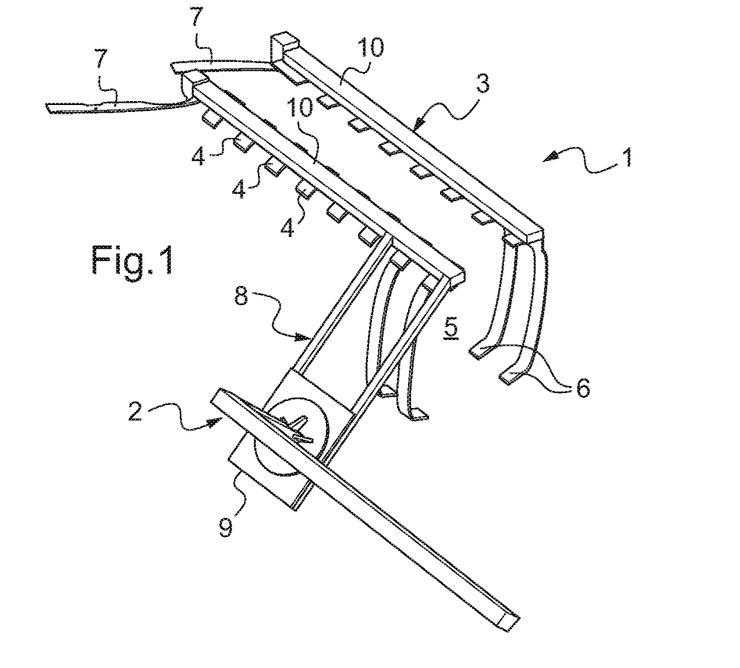
FIG. 1 is a schematic perspective view of an example of an embodiment of the lifting device of the present invention, in a first configuration.

FIG. 1 shows an example of an embodiment of a lifting device 1 for replacing dynamic or static components of helicopter-type rotary wing aircraft. The device 1 comprises a lifting means 2 to move said components between an installation/removal position on the aircraft and a loading/unloading position near the aircraft, for example on the ground. FIG. 1 shows the lifting device 1 in a first installation configuration on a helicopter (not shown).

The lifting device 1 comprises a supporting structure 3 on which the lifting means 2 is mounted, The lifting device 1 comprises support means 4 rigidly attached to the supporting structure 3 and designed to rest directly on an airframe 5 (not shown) of the aircraft.

For this purpose, the supporting structure 3 comprises attachment or immobilization means 6 having a shape that complements the shape of the airframe 5 (not shown), intended to partly encompass said airframe 5. The attachment or immobilization means 6 are known as such.

Additional attachment members 7 consisting of attachment rods connected to the supporting structure 3 are also provided for this purpose. These rods are secured for instance at fixed provisions of the helicopter or at the landing gear with a clamping belt or at other positions.

The lifting device 1 also comprises handling means 8 to move the lifting means 2 from a position located near the aircraft to an operational position on the supporting structure 3, once the latter has been secured to the airframe 5. The handling means 8 may, for example, consist of installation rails.

The lifting means 2 is preferably mounted in a movable manner on the supporting structure 3. For example, in an operational configuration shown in FIG. 2, the lifting means 2 is mounted rotationally movable on a trolley 9, which itself is translationally movable on the supporting structure 3. The trolley 9 is also used to move the lifting means 2 on the handling means 8, for example by means of a manually or motor-operated winch (not shown).

The supporting structure 3 therefore comprises at least one part on which the lifting means 2 travels. The supporting structure 3 may, for example, comprise two parallel rails 10 resting on the airframe 5 in a substantially centred manner, via the support means 4.

The support means 4 comprise pads capable of locally adapting to the outer shape of the airframe 5. These pads may, for example, comprise a flexible element or contact layer. The airframe 5 can so be protected.

Advantageously, the pads may comprise attachment members cooperating with external predefined parts of said airframe 5.

The pads are preferably distributed on the supporting structure 3 in such a manner that when said supporting structure 3 is mounted on the airframe 5, their positions correspond to reinforced regions of said airframe 5.

Figure 3:
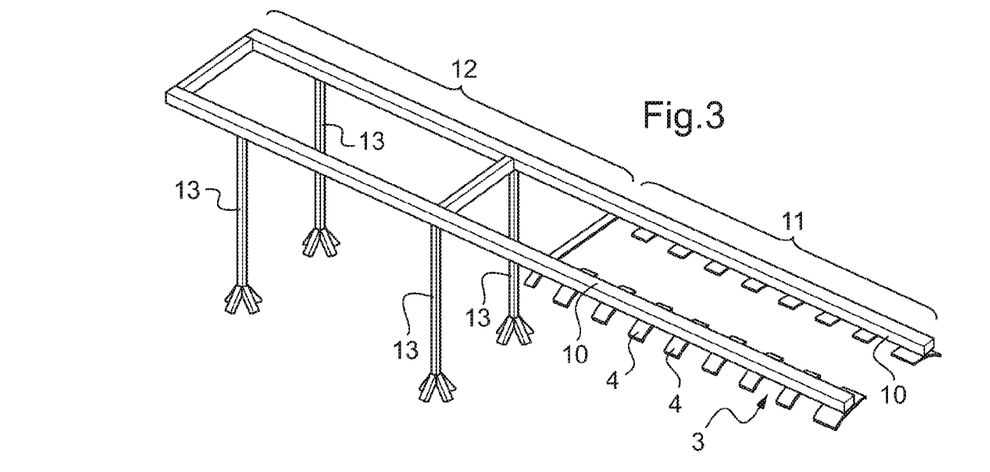
FIG. 3 is a schematic perspective view of part of another example of an embodiment of the lifting device of the present invention, in a third configuration.

The supporting structure 3 shown in FIG. 3 comprises a first part 11 equipped with support means 4 and a second part 12 equipped with ground-based support members 13. The second part 12 extends longitudinally from the first part 11 along a longitudinal direction of the helicopter. The trolley 9 can thus travel on each of parts 11 and 12 of the supporting structure 3. The latter is positioned at the forward end of the airframe 5 of the helicopter.

Figure 4:
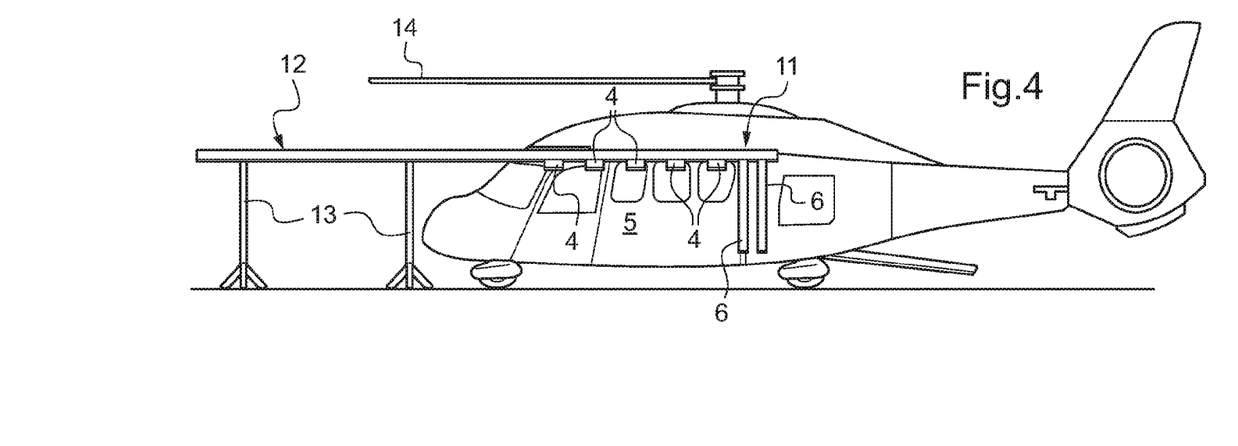
FIG. 4 is a schematic profile view of the part of the device of the present invention shown in FIG. 3, mounted on a helicopter.

FIG. 4 shows the supporting structure 3 of FIG. 3 once mounted on the airframe 5 of a helicopter, below the extension plane of the rotor blades 14.

Figure 5:
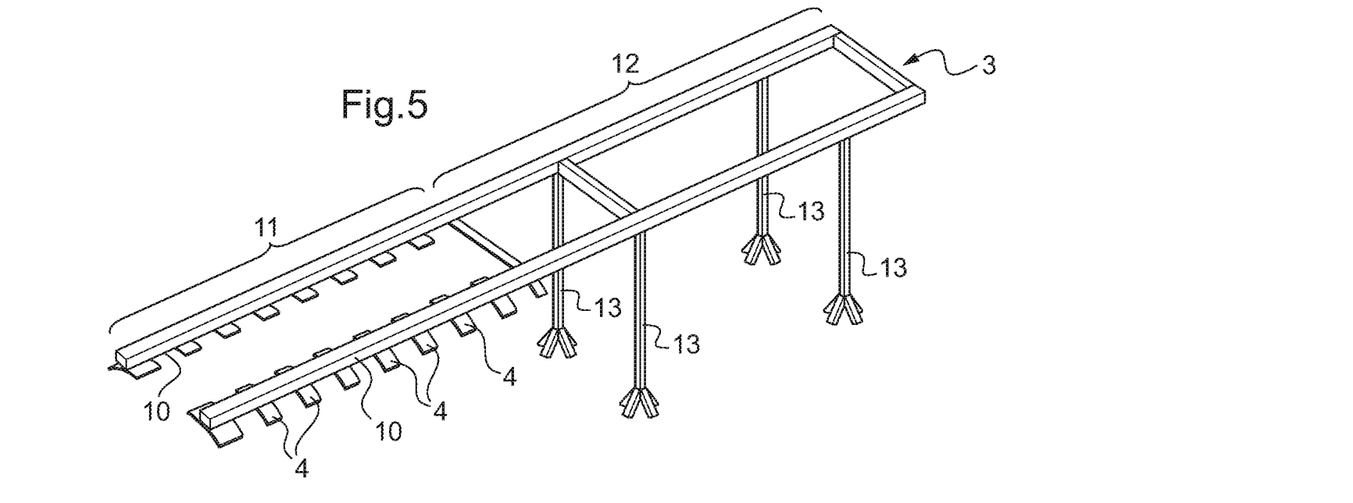
FIG. 5 is a schematic perspective view of part of another example of an embodiment of the lifting device of the present invention, in a fourth configuration.
Figure 6:
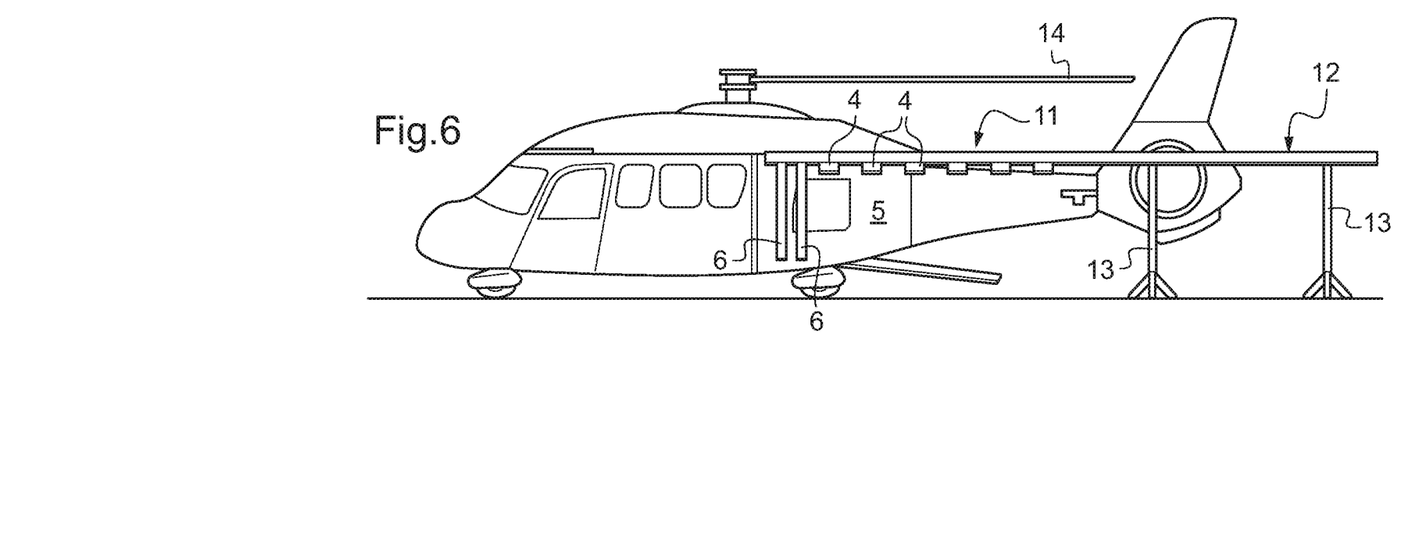
FIG. 6 is a schematic profile view of the part of the device of the present invention shown in FIG. 5, mounted on a helicopter.

The supporting structure 3 shown in FIG. 5 is intended to be positioned at the aft end of the airframe 5 of a helicopter. FIG. 6 can be referred to, for example. The supporting structures 3 shown in FIGS. 3 and 5 may constitute identical or different modules. In certain cases, it is possible to differentiate the first parts 11 from the supporting structures 3 so as to ensure good adaptability to the airframe 5. This is indispensable when the outer shape of the airframe 5 in the regions where the pads rest is different at the forward and aft ends.

The ground-based support members 13 are preferably adjustable lengthwise to adapt to ground irregularities. All known length adjustment systems, such as screw jacks, adjusting screws or others, may be integrated into the ground-based support members 13.

The lifting device may, for example, be associated with airframe reinforcement means 15 arranged inside said airframe 5.

Figure 7:
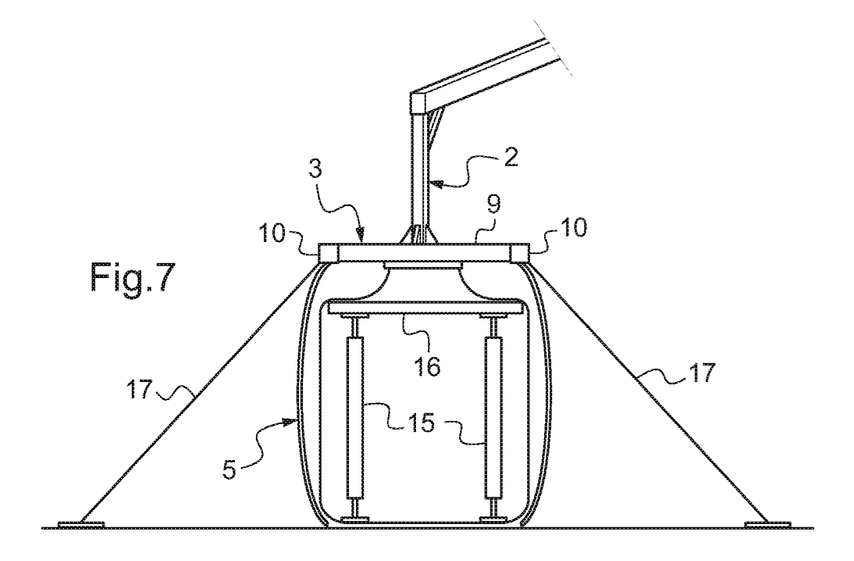
FIG. 7 is a cross-sectional front view of a helicopter airframe on which the lifting device of the present invention has been mounted, associated with stabilization means and airframe reinforcement means, in a first configuration.
Figure 9:
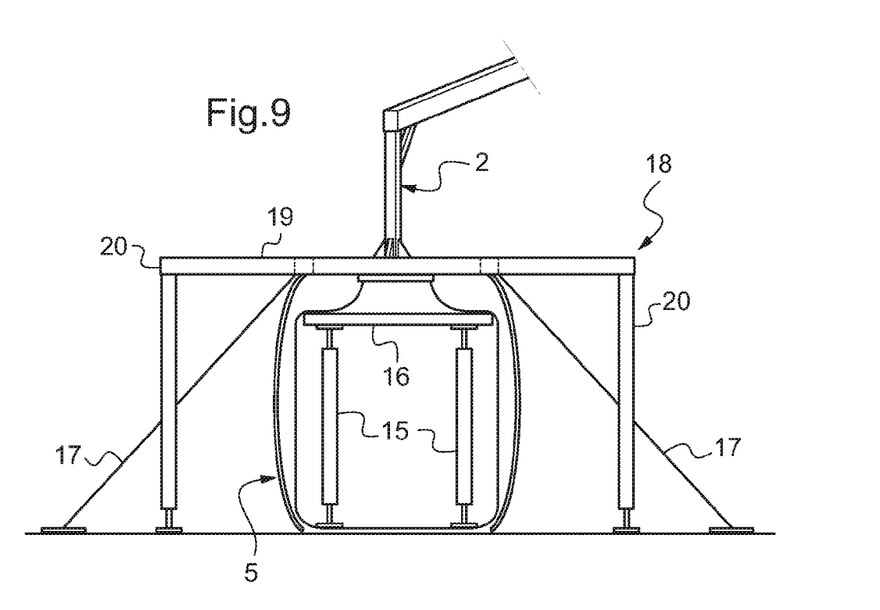
FIG. 9 is a cross-sectional front view of a helicopter airframe on which the lifting device of the present invention has been mounted, associated with additional stabilization means and airframe reinforcement means, in a first configuration.

The reinforcement means 15 shown in FIG. 7 or 9 comprise adjustable length beams positioned in a substantially vertical position inside the airframe 5 and resting at one end on the floor of said airframe 5 and at the other end against the roof of the airframe 5 via a crossbar 16. The latter allows better distribution of the stresses generated by the lifting device.

Figure 8:
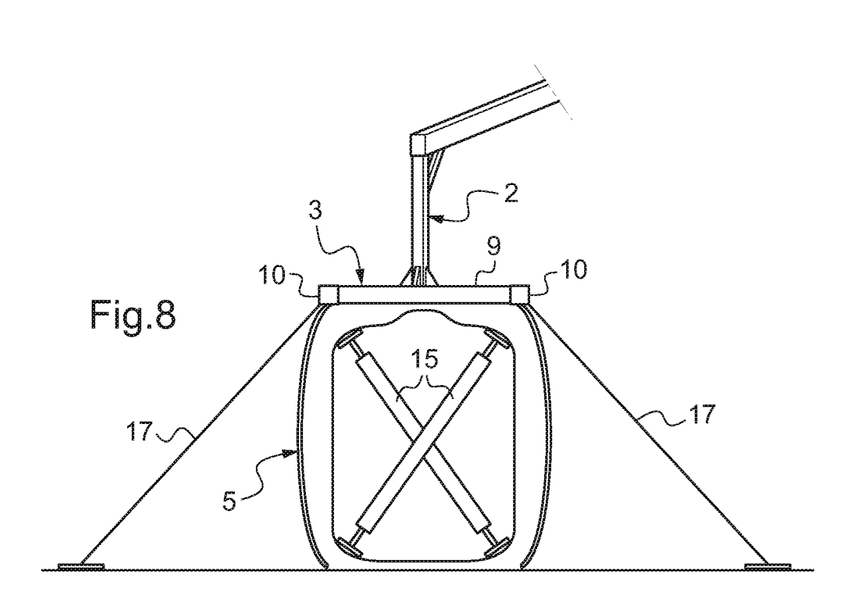
FIG. 8 is a cross-sectional front view of a helicopter airframe on which the lifting device of the present invention has been mounted, associated with stabilization means and airframe reinforcement means, in a second configuration.

According to another installation method shown in FIG. 8, the reinforcement means 15 may extend substantially along the diagonal directions of the airframe 5.

The number and position of the reinforcement means 15 are of course adapted to the load to be withstood by the airframe 5 and to the intrinsic structural reinforcements of said airframe 5. A specific adaptation for each type or model of helicopter is preferable.

The lifting means 2 may, for example, consist of an articulated and/or telescopic arm. The lifting means, known as such, may comprise one or more articulated sections.

The lifting device also comprises hydraulic and/or electrical control means to move the lifting arm and the trolley 9. The trolley 9 is moved for instance with manpower or with other elements at a transport device or via tracks on stabilization means.

In another possibility, a transportation device can be used which includes elements to bring the lifting means in the working position and hydraulic and/or electrical control means.

According to an example of an embodiment, the lifting device comprises stabilization means 17 (see, e.g., FIGS. 7-9) designed to be secured to the supporting structure 3 and to rest on the ground. The stabilization means 17 may, for example, consist of adjustable length rods arranged on both sides of the airframe 5, with the most distant end from the airframe 5 resting on the ground. This improves the stability of the assembly formed by the lifting device 1 and the helicopter.

Figure 2:
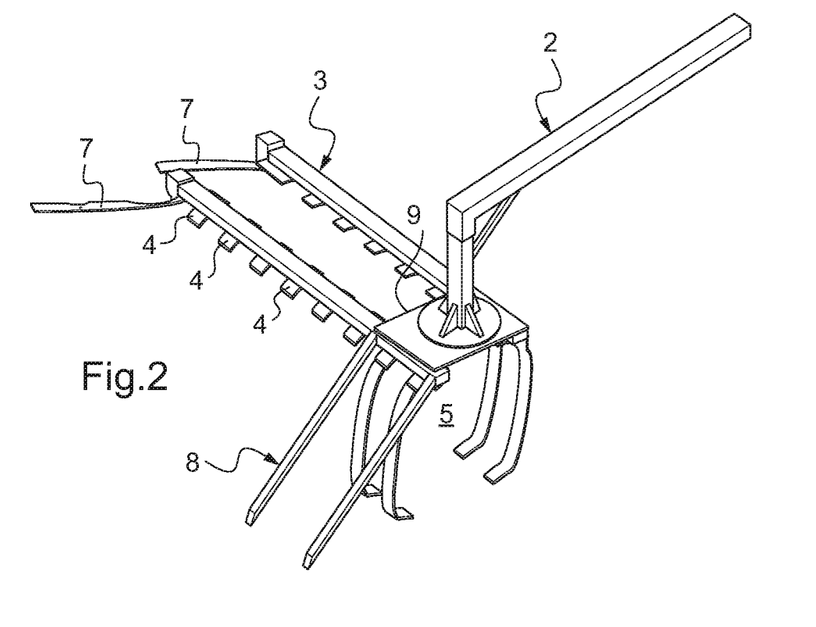
FIG. 2 is a schematic perspective view of an example of an embodiment of the lifting device of the present invention, in a second configuration.

According to another example of an embodiment of the lifting device 1, the handling means 8 may at least partly constitute the stabilization means 17. FIGS. 1 and 2 can be referred to, for example.

Figures 10, 11:
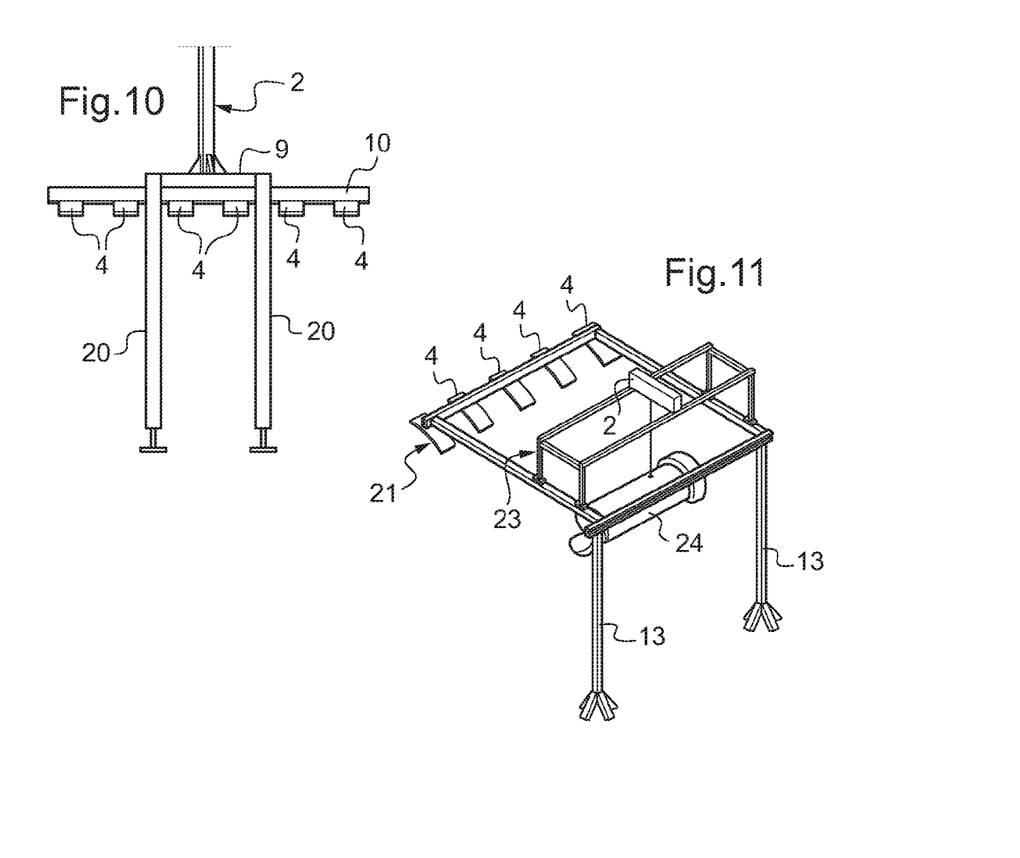
FIG. 10 is a partial schematic view of the additional stabilization means associated with lifting device of the present invention.
FIG. 11 is a schematic perspective view of another example of an embodiment of the lifting device of the present invention.

The lifting device 1 of the present invention shown in FIGS. 9 and 10 comprises additional stabilization means 18 rigidly attached to the rails 10 and resting on the ground. The additional stabilization means 18 advantageously comprise two horizontal beams 19 extending transversely to the rails 10 and between which the trolley 9 is positioned. The additional stabilization means 18 also comprise, on both sides of the airframe 5, two vertical beams 20 with adjustable lengths and resting on the ground.

The additional stabilization means 18 advantageously move with the trolley 9. This ensures optimal stability for each position of the lifting means 2 on the supporting structure 3. By way of examples, these beams 19, 20 are connected at fixed provisions of the helicopter or at the landing gear with a clamping belt or at other positions.

The additional stabilization means 18 may be used alone or in association with the stabilization means 17 and/or the handling means 8.

According to an example of an embodiment of the present invention, the lifting device is modular, with dimensions after disassembly allowing it to be transported as internal or external load on a helicopter.

Figure 12:
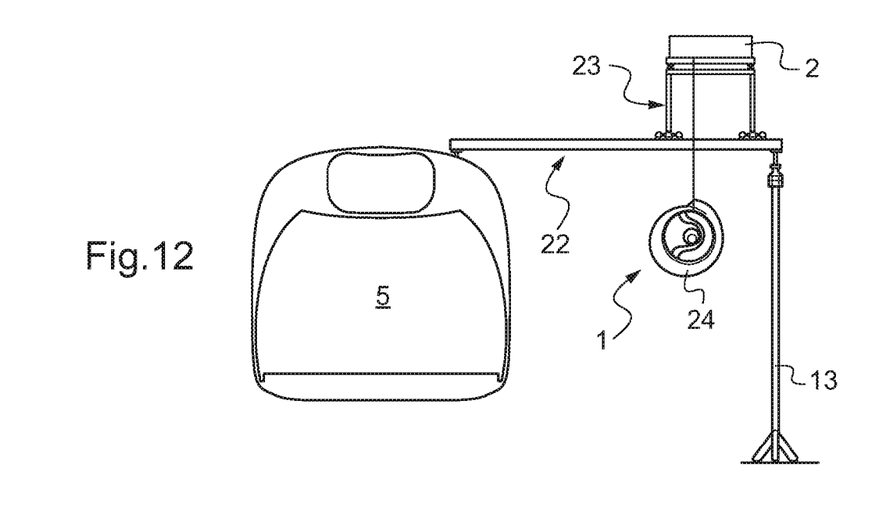
FIG. 12 is a schematic front view of the part of the lifting device shown in FIG. 11, mounted laterally on the airframe of a helicopter.
Figure 13:
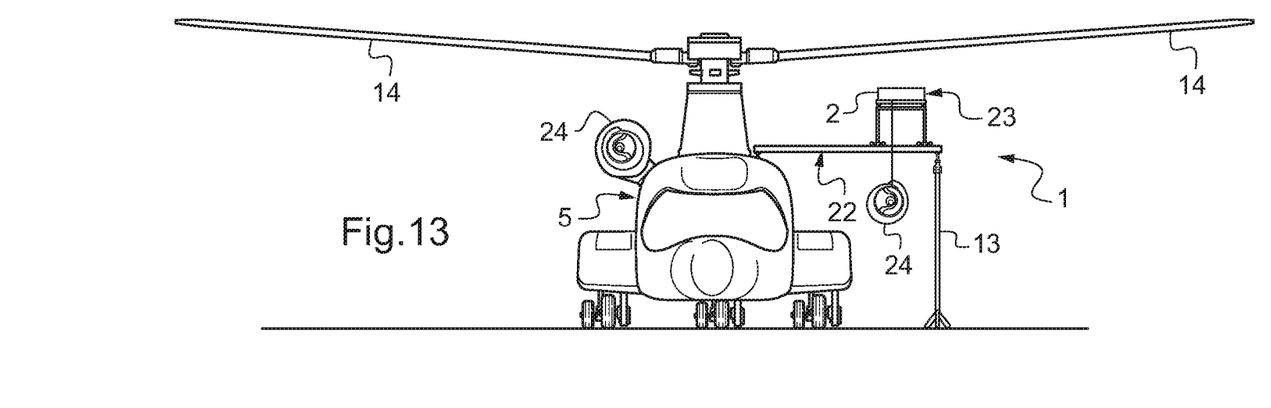
FIG. 13 is another and simplified view of FIG. 12.

According to a second modular design of the lifting device of the present invention, shown in FIGS. 11 to 13, the supporting structure 3 comprises a first lateral part 21 equipped with support means 4 in contact with an upper lateral part of the airframe 5.

A second lateral part 22, consisting for example of parallel rails extending laterally from the first lateral part 21, is equipped with ground-based support members 13.

The lifting means 2 is a winch or hoist type device mounted on a mobile structure 23. The latter moves translationally along a lateral direction on the second lateral part 22.

The lifting means 2 is raised with respect to the second lateral part 22 and moves translationally along a longitudinal direction on the mobile structure 23.

The lifting device 1 of the present invention can therefore easily lower an engine 24 onto the ground and load a new engine 24 to place it in its compartment on the airframe 5.

A third design of the lifting device of the present invention would consist of associating the lifting device 1 according to the second design with a lifting device 1 according to the first design. Such a complex lifting device could be useful when repairing a helicopter of significant size and/or with specific structural characteristics.

Naturally, the present invention is subject to numerous variations as to its implementation. Although several embodiments have been described, it is obviously not possible to exhaustively identify all possible embodiments. The possibility of replacing one of the means described with an equivalent means can of course be considered without departing from the scope of the present invention.

What is claimed is:

1. A lifting device for replacing dynamic or static components of helicopter-type rotary wing aircraft having an airframe having an outer shape, the device comprising:
    a lifting means for moving said components between an installation/removal position and a loading/unloading position located near the aircraft,
    a supporting structure comprising a first part with support means and a second part with ground-based support members that extend longitudinally from the first part, and
    immobilization or attachment means for securing the supporting structure to the airframe,
    wherein the lifting means is mounted on the supporting structure and the support means, rigidly attached to the supporting structure, is in contact with the airframe of the aircraft, wherein the lifting device includes airframe reinforcement means arranged inside the airframe.

2. The lifting device according to claim 1, wherein the lifting means is mounted in a movable manner on the supporting structure.

3. The lifting device according to claim 1, also including handling means to move the lifting means from a position located near the aircraft to an operational position on the supporting structure, once the latter has been secured to the airframe.

4. The lifting device according to claim 3, further including stabilization means secured to the supporting structure and to rest on the ground.

5. The lifting device according to claim 4, wherein the handling means at least partly constitutes the stabilization means.

6. The lifting device according to claim 1, wherein the supporting structure comprises pads capable of locally adapting to the outer shape of the airframe and resting directly on the airframe.

7. The lifting device according to claim 6, wherein the pads are distributed on the supporting structure in such a manner that when the supporting structure is mounted on the airframe, the pads are positioned so as to correspond to reinforced regions of said airframe.

8. The lifting device according to claim 7, wherein the supporting structure comprises at least one part on which the lifting means travels.

9. The lifting device according to claim 1, wherein the first part of the supporting structure comprises multiple parallel rails resting on the airframe in a substantially centered manner via the support means.

10. The lifting device according to claim 1, wherein the lifting means include at least one of an articulated arm and a telescopic arm.

11. The lifting device according to claim 10, wherein the lifting means is rotationally movable on a trolley, which is translationally movable on the supporting structure.

12. The lifting device according to claim 1, wherein the first part comprises a first lateral part with the support means being in contact with an upper lateral part of the airframe, and the second part comprises a second lateral part extending from the first lateral part.

13. The lifting device according to claim 12, wherein the lifting means includes a winch or hoist type device mounted on a mobile structure that moves translationally in at least one direction on the first and second lateral parts.

14. The lifting device according to claim 1, further having at least one of hydraulic control means and electrical control means.

15. The lifting device according to claim 1, wherein the device is modular, having the attribute after disassembly of allowing it to be transported as internal or external load on a helicopter.

16. A lifting device for replacing dynamic or static components of helicopter-type rotary wing aircraft having an airframe having an outer shape, the device comprising:
    a lifter for moving the components between an installation/removal position and a loading/unloading position located near the aircraft,
    a supporting structure comprising a first part with supports and a second part with ground-based support members that extend longitudinally from the first part, and
    immobilization or attachment members for securing the supporting structure to the airframe,
    wherein the lifter is mounted on the supporting structure and the supports, rigidly attached to the supporting structure, are in contact with the airframe of the aircraft, wherein the lifting device includes an airframe reinforcement member arranged inside the airframe.

17. A lifting device for replacing dynamic or static components of helicopter-type rotary wing aircraft having an airframe having an outer shape, the device comprising:
    a lifting means for moving said components between an installation/removal position and a loading/unloading position located near the aircraft,
    a supporting structure, and
    immobilization or attachment means for securing the supporting structure to the airframe,
    wherein the lifting means is mounted on the supporting structure and the support means, rigidly attached to the supporting structure, is in contact with the airframe of the aircraft, wherein the lifting device includes airframe reinforcement means arranged inside the airframe.

* * * * *